(No Model.)
W. T. WHYTE.
VEGETABLE SLICER.
No. 574,971. Patented Jan. 12, 1897.
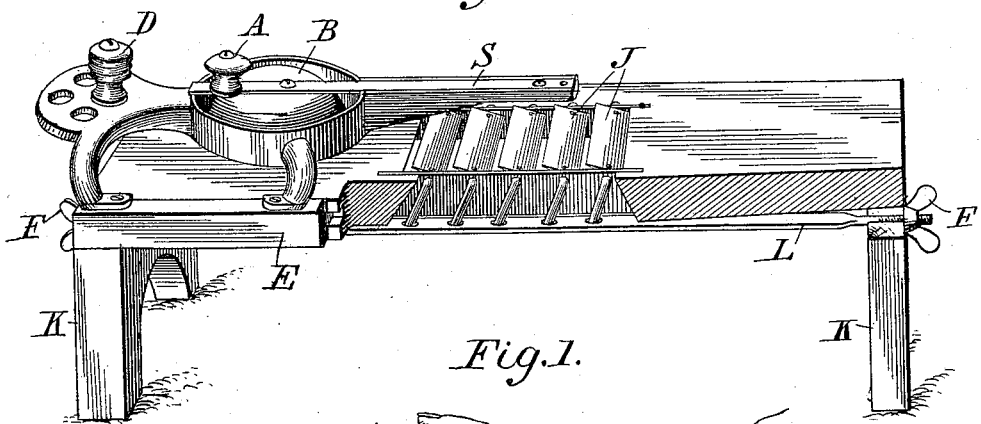
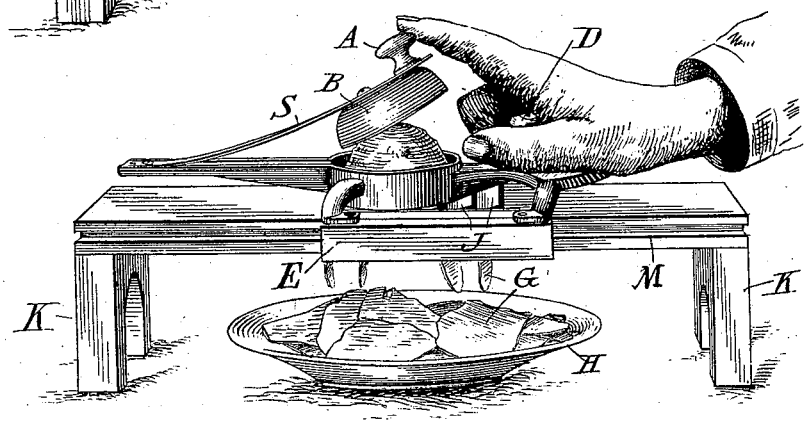
Witnesses:
C. N. Potts, M. D.
F. M. Hawk
Inventor:
W. T. Whyte

UNITED STATES PATENT OFFICE.

WILLIAM T. WHYTE, OF LIMA, OHIO.

VEGETABLE-SLICER.

SPECIFICATION forming part of Letters Patent No. 574,971, dated January 12, 1897.

Application filed February 20, 1895. Serial No. 539,161. (No model.)

*To all whom it may concern:*

Be it known that I, WILLIAM T. WHYTE, a citizen of the United States, residing in Lima, in the county of Allen and the State of Ohio, have invented a new and useful Fruit and Vegetable Slicer, of which the following is a specification.

My invention relates to improvements in fruit and vegetable slicers.

A hopper is mounted to slide on a table over an opening in said table. Said opening is provided with knives, pivoted to permit of angular adjustment. Said angular adjustment is secured by an arm extending through the supporting-frame and bent down parallel thereto and extending into holes in a common strip, by the longitudinal adjustment of which the knives are rotated to and held in any angular adjustment.

Figure 1 is a vertical section of the entire machine as it appears in the operation of slicing. Fig. 2 is a sectional view of the table, showing an opening in said table provided with knives J J, pivoted to permit of angular adjustment of the knives.

The angular adjustment is secured by an arm extending laterally from each knife J J through the supporting-frame and bent down parallel thereto and extending into holes in a common strip I, with thumb-screws F F at each end, by the longitudinal adjustment of which the knives are rotated to and held in any angular adjustment, substantially as described.

The table, Figs. 1 and 2, resting on legs K K, with hopper attached to table, to reciprocate back and forth, over knives J J, in groove M, with pocket receptacle for receiving any small vegetable for slicing. The follower B, adjusted by spring S, automatically secures the article to be sliced and avoids all danger. Said hopper is operated by knob D. The entire hopper slides in grooves M M. Side pieces E E, with tongue, support the hopper, and the slices G fall into dish H.

I am aware that prior to my invention vegetable-slicers have been made for cutting cabbage with open box or hopper reciprocating over knives. I therefore do not claim such a combination broadly, but What I do claim as my invention, and desire to secure by Letters Patent, is—

In combination in a vegetable-cutter, an automatic hopper, mounted to slide on a table, over an opening in said table provided with knives, pivoted to permit of angular adjustment, said angular adjustment being secured by an arm extending laterally from each knife, through the supporting-frame and bent down parallel thereto and extending into holes in a common strip, by the longitudinal adjustment of which, the knives are rotated to and held in any angular adjustment, substantially as described.

W. T. WHYTE.

Witnesses:
WM. MUMAUGH,
JAMES DUDDY.